Figure 1:
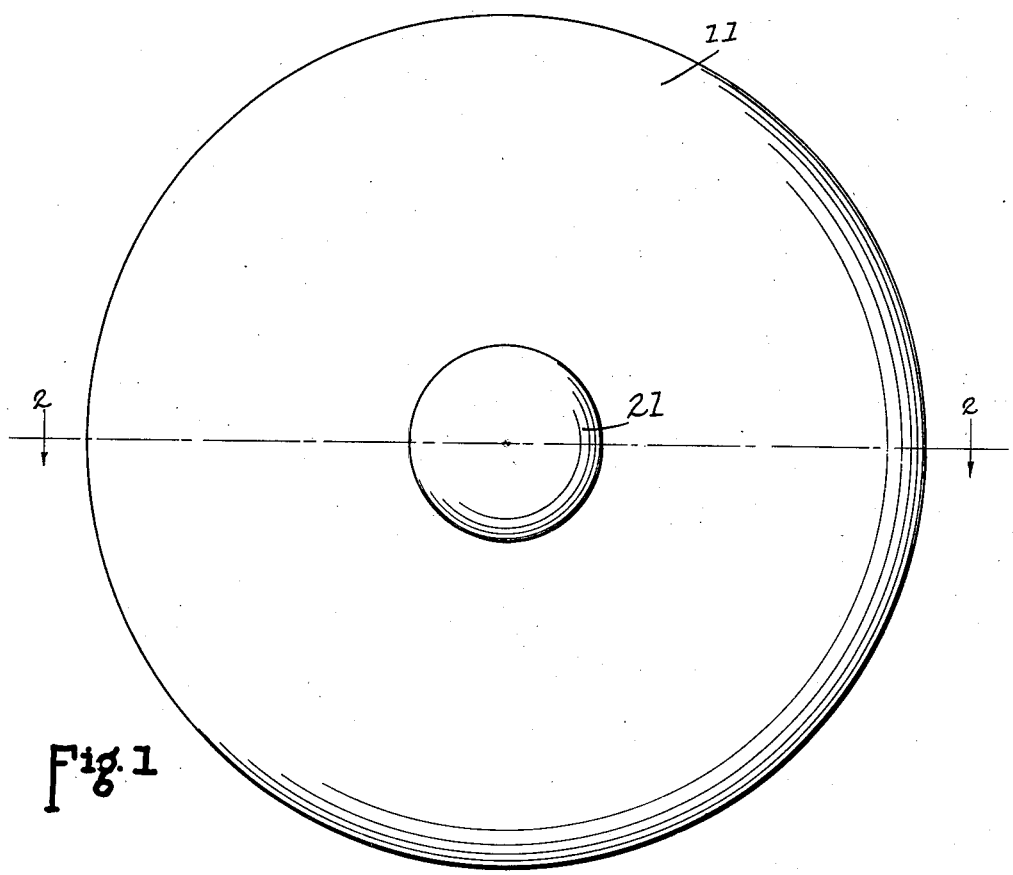

Feb. 23, 1926.

C. C. SPREEN 1,574,710

COVER

Filed July 6, 1925

Charles C. Spreen
Inventor

Attorneys

Patented Feb. 23, 1926.

1,574,710

UNITED STATES PATENT OFFICE.

CHARLES C. SPREEN, OF DETROIT, MICHIGAN, ASSIGNOR TO KELVINATOR CORPORATION, OF DETROIT, MICHIGAN, A CORPORATION OF MICHIGAN.

COVER.

Application filed July 6, 1925. Serial No. 41,629.

*To all whom it may concern:*

Be it known that I, CHARLES C. SPREEN, a citizen of the United States of America, and a resident of Detroit, in the county of Wayne and State of Michigan, have invented certain new and useful Improvements in Covers, of which the following is a full, clear, and exact description.

Figure 2:
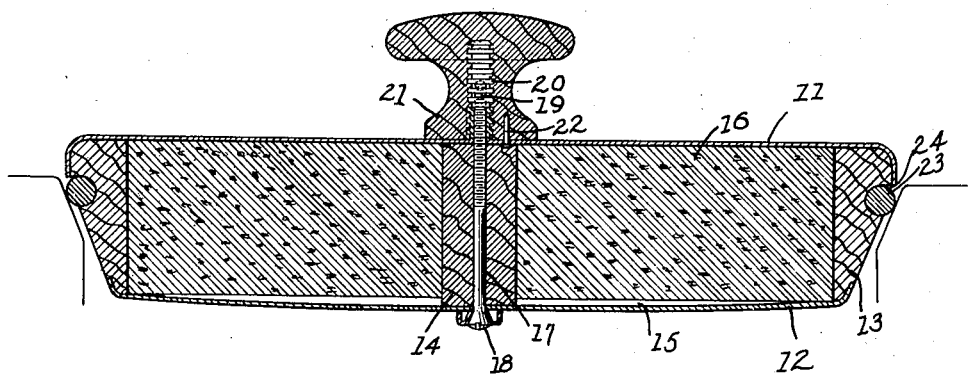

My invention relates to covers, and particularly to covers for closing the openings in the top of ice cream cabinets provided to afford access to the interior of the ice cream receptacles disposed within the cabinet, and the principal object of my invention is to provide a new and improved cover of this type. In the drawings accompanying this specification and forming a part thereof I have shown, for purposes of illustration, one form which my invention may assume. In these drawings:

Figure 1 is a top plan view of this illustrative embodiment of my invention, while Figure 2 is a section on the line 2—2 of Figure 1.

The cover herein shown comprises a metallic upper plate 11 and a metallic lower plate 12 turned over at their edges to embrace an annular spacing member 13 arranged to cooperate with the central spacing member 14 to maintain the plates 11 and 12 spaced apart to provide a closed space 15 for the reception of the heat insulating material 16. The spacing members 13 and 14 may be formed of any desired material, particularly wood, rubber, or compositions, but are herein shown as formed of wood. The plates 11 and 12, the spacing members 13 and 14, and the insulating material 16, are all maintained in assembled relation by means of a single bolt 17 having its head 18 in engagement with the lower face of the lower plate 12, passing upwardly through a central aperture in the lower plate 12, a central aperture in the space 14, and a central aperture in the upper plate 11, and screw threaded at its upper end 19 to engage the cooperating threads of a metal sleeve 20 embedded in a knob 21 effective both as a handle for lifting the cover and acting as a nut for the bolt 17, and maintained against rotation by means of a pin 22 extending upwardly into the knob 21 through an eccentric aperture in the top plate 11.

The engagement of the cover with the adjacent surface is cushioned by means of a rubber ring 23 disposed in a groove 24 in the exterior face of the annular spacing member 13.

From the above description it will be obvious to those skilled in the art that I have provided a new and improved cover. In addition, it will also be obvious to those skilled in the art that the particular embodiment of my invention herein shown and described may be variously changed and modified without sacrificing the advantages of my invention or departing from the spirit thereof, and it will therefore be understood that this disclosure is illustrative only and that my invention is not limited thereto.

I claim:

1. A cover, for an opening in the top of an ice cream cabinet affording access to the interior of an ice cream receptacle therebelow, comprising a top plate, a bottom plate, an annular spacer separating said plates adjacent the periphery thereof, a circular central spacer separating said plates centrally thereof, heat insulating material in the chamber thus formed, and tie means connecting said plates together in such spaced relation.

2. A cover, for an opening in the top of an ice cream cabinet affording access to the interior of an ice cream receptacle therebelow, comprising a top plate, a bottom plate, an annular spacer separating said plates adjacent the periphery thereof and provided on its exterior with an annular groove, a central spacer separating said plates centrally thereof, tie means connecting said plates together in such spaced relation, and a resilient ring seated in said groove and projecting to engage said top.

In testimony whereof I hereunto affix my signature.

CHARLES C. SPREEN.